Figure 1:
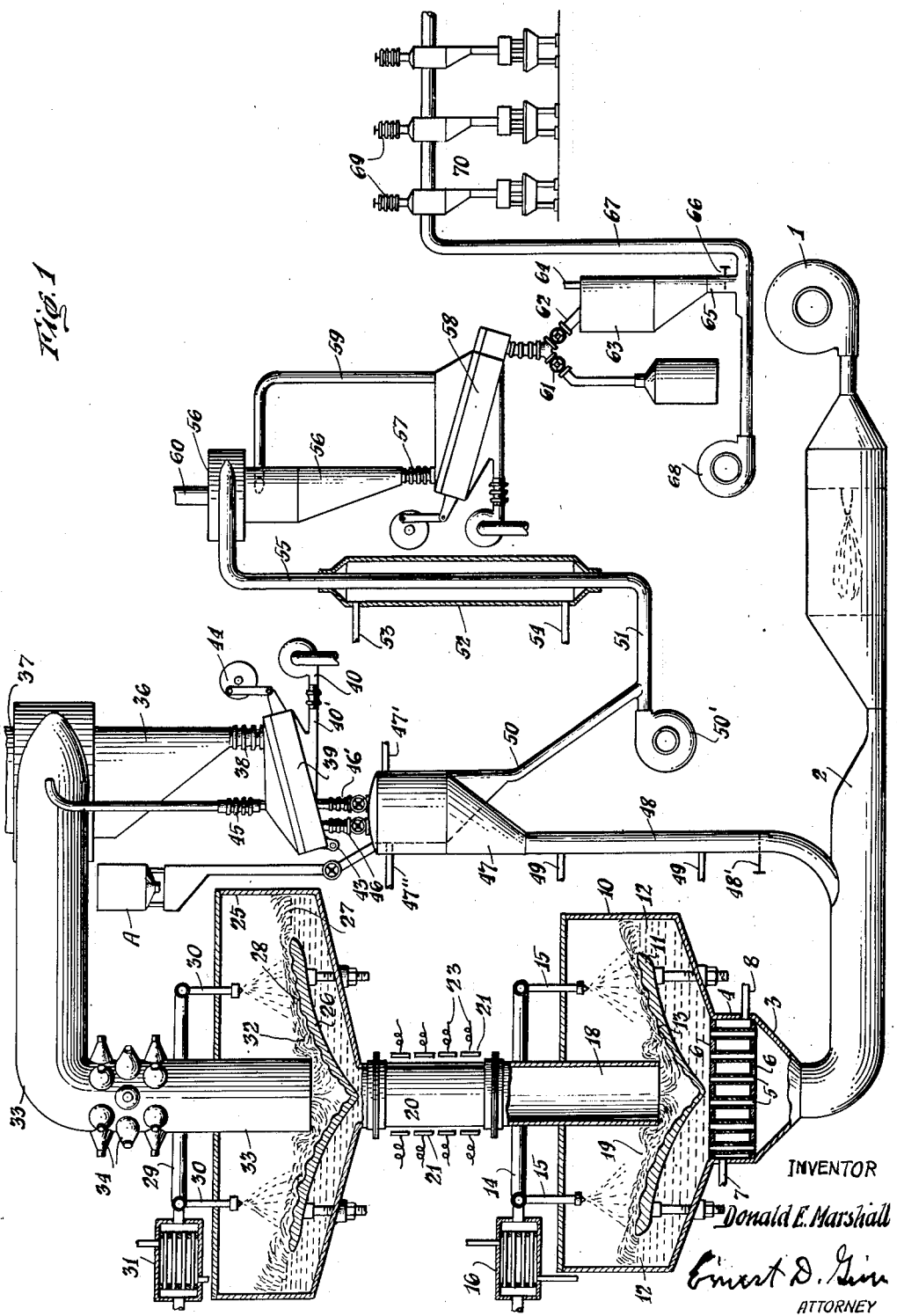

Dec. 25, 1951 D. E. MARSHALL 2,579,944
PROCESS AND APPARATUS FOR COATING
PARTICULATE MATERIAL
Filed April 9, 1945 2 SHEETS—SHEET 1

INVENTOR
Donald E. Marshall
Ernest D. Ginn
ATTORNEY

Dec. 25, 1951  D. E. MARSHALL  2,579,944
PROCESS AND APPARATUS FOR COATING
PARTICULATE MATERIAL
Filed April 9, 1945  2 SHEETS—SHEET 2

INVENTOR
Donald E. Marshall
BY
Ernest D. Given
ATTORNEY

UNITED STATES PATENT OFFICE 2,579,944

PROCESS AND APPARATUS FOR COATING PARTICULATE MATERIAL

Donald E. Marshall, Summit, N. J., assignor to Colgate-Palmolive-Peet Company, a corporation of Delaware Application April 9, 1945, Serial No. 587,404

16 Claims. (Cl. 117—100)

This invention relates to a process and apparatus for treating materials that comprise liquids that carry solids, such as soap mixtures, wetting agent mixtures, milk, fruit juices, coffee solution, plastic solutions, starch solutions, sugar solutions, chemical solutions, and the like.

In carrying out the invention, liquids having solids dissolved or mixed therein are sprayed or flashed on a moving bed of finely divided solid particles in such a way that great exposure to heat, vaporization or chemical reaction occurs on the surfaces of these particles. The moving bed of particles is fluidized by aeration and flows through a closed system easily adaptable to gain almost any condition of time, temperature, pressure or recycling required to carry out a drying cycle, a chemical reaction or a particle formation for the solids in the original solution.

Some of the advantages of the invention are that the equipment used has large reaction capacity in proportion to its size; the time required to remove the solids from the liquids can be controlled; the size and density and structure of the solid particles obtained from the liquids can be varied; the temperature to which the material is subjected can be easily regulated; injury of the products by erosion, adhesion to surfaces, overheating is minimized; very little, if any dust is produced; and the closed system in which it operates permits the use of heat from a variety of heat sources; also differential vapor pressures may be developed by heat, vacuum or conditioned aeration gas to promote a wide range of reactions.

All this can be accomplished with this invention and other advantages can be obtained thereby with apparatus of economical size, without serious fire hazard, or hazard from toxic materials, and without danger of explosions due to impact or electric sparks.

In carrying out the process the principles of fluidization of finely divided solids by a gas stream are used. In this way the solids are intimately and extensively exposed to gases; good heat transfer between solids and gases and between a fluidized mass and sources of heat is obtained; delicate and sticky particles can be treated until they are sufficiently dry and cool to be handled safely for delivery to a packaging center; particles of solids that are smaller than desired are recycled to produce particles of the proper size, density and structure; input either as a vapor or as a liquid spray carrying solids is introduced to effect the particle formation that is desired, which may include multi-stage spraying of different liquids that carry solids; partially dried fluidized solids are heated by conduction from heat exchanger surfaces that are heated by steam or high frequency electrostatic fields, or infra red radiation, or all, thus causing the vapors that are driven off of the solids to serve as a source of gas to further the fluidizing action.

The invention may be carried out with different arrangements of apparatus, two of which are illustrated in the accompanying drawings which are somewhat diagrammatic illustrations of apparatus suitable for carrying out the invention.

Figure 2:
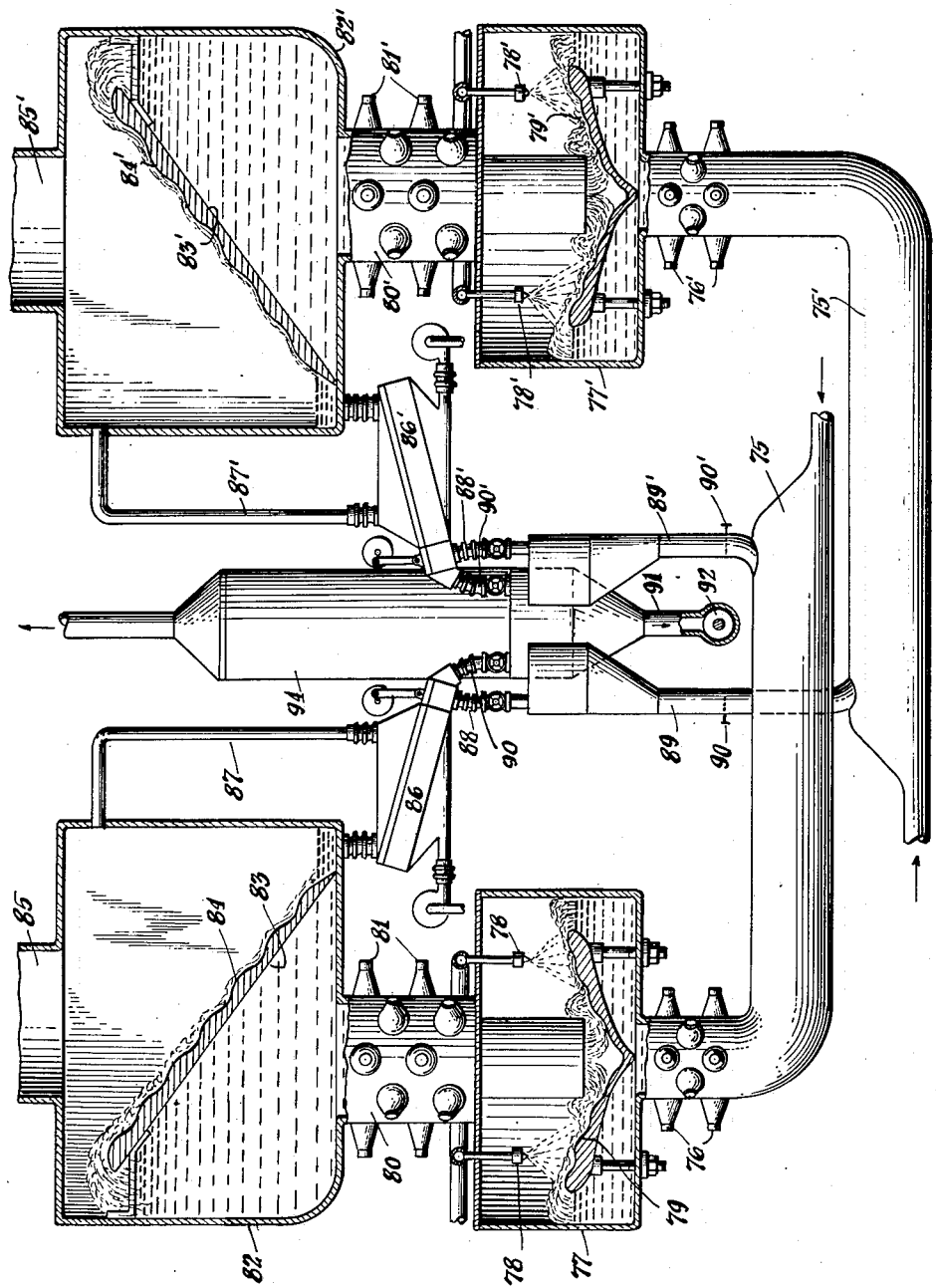

In the drawings Fig. 1 is a side view partly in section showing an arrangement of apparatus for carrying out the invention; and Fig. 2 is a similar view showing a modification.

In Fig. 1 of the drawings, reference character 1 indicates a blower for forcing hot gases into the conduit or pipe 2 which is connected to the bottom of the heater 3 of the multi-tube type. This heater comprises a chamber 4 that is provided with a plurality of parallel tubes 5 with their ends anchored in headers 6. An inlet 7 for steam and an outlet 8 for the cool steam or water are provided in the usual way for supplying heat to the heater 3.

A spray chamber 10 which is circular in cross-section has a conically-shaped bottom with a central flat portion into which the tubes 5 enter. An annular adjustable baffle or filler 11 is located in the lower portion of the chamber 10 and is spaced from the bottom of the chamber. It is of such a size that an annular passage 12 is provided between its edge and the inside wall of the chamber 10. This annular passage is of an area about equal to the combined cross-sectional areas of the insides of the tubes 5. The inside of the baffle 11 is corrugated, as indicated at 13, with the corrugations decreasing in size or height toward the center. A pipe 14 is provided with spray nozzles 15 arranged on a circle extending into the inside of the chamber 10 for spraying the liquids carrying solids into this chamber. A steam heater 16 is provided for heating the liquid that is introduced through the pipe 14.

An outlet 18 has its lower open end projecting below the fluidized solids surfaces 19 in the chamber 10. This outlet has a non-metallic section 20 outside of the chamber 10 around which a concentrated electrostatic field is generated by high frequency electric current that is applied along the outside thereof by electrodes 21 to which the leads 23 are connected.

A chamber 25 similar to the chamber 10 is provided, into the central lower end of which the outlet 18 enters. The adjustable baffle 26 in this chamber is similar to the baffle 11, the passageway 27 is of the same cross-sectional area as the tube 20, and the corrugations 28 are similar to the corrugations 13. An inlet pipe 29 with spray branches 30 and a heater 31 are provided which are similar to those described above.

The outlet 33 from chamber 25 has its lower end extending below the fluidized solids surfaces 32. Infra-red electric lamp heaters 34 are located outside of chamber 25 around this outlet 33 for heating the products that pass therethrough. The outlet 33 enters an expansion stack 36 tangentially. This stack has an outlet 37 at the top for escape of gases. A flexible connection 38 extends from the bottom of the stack 36 to a separator or classifier 39 for particles of different sizes. This separator may be of the vibrating air-table type which is provided with an aerating device 40 to cool and aerate the particles of materials by air which enters through the inlet 40' after these particles pass through the flexible connection 38. Reference characters 43, 44 indicate diagrammatically means to support and vibrate the classifier table 39. A gas or vapor outlet 45 is provided from the classifier table 39. A valved outlet 46 is provided for small size particles that are to be recirculated and built up in size by being returned to the system. These particles are introduced into the hopper 47 and thence into the pipe 48 which is connected to the conduit 2. Fine particles of the material to be treated may be introduced into hopper 47 from source A when desired. A gas inlet 47' is provided at the top of hopper 47 and a slide valve 48' is provided near the lower end of pipe 48 to induce and regulate the flow of solid particles.

A valved outlet 46' extends from the classifier table 39 for the suitable or desired sizes of material which enter the tube 50 and are then carried by the gas entering pipe 47" under pressure and the fluidizing gas or compressed air introduced by blower 50' through pipe 51 to the lower end of the cooler 52 that is cooled by cool water entering at inlet 53 and leaving by outlet 54. A conduit 55 leads from the top of the cooler 52 and enters an expansion stack 56. Solid particles pass through the flexible connection 57 to a classifying separator 58 which is adapted to separate particles that are either too fine or too coarse from particles of desired size. A conduit 59 extends from the separator 58 so as to return gases from this separator to the outlet 60.

A valved conduit 61 is provided at the lower end of the table 58 to remove particles that are too fine or too coarse and therefore need to be re-treated or re-worked in the apparatus after the coarse particles have been broken up. A valved conduit 62 extends from the table 58 for introducing particles of the right size into the elongated container 63. These particles are carried by the gas or compressed air that is introduced at 64 and the fluidizing air introduced at 68. An outlet 65 is provided at the bottom of the container 63 with a valve 66 at its lower end. This outlet enters conduit 67. The conduit 67 extends to a conveying and packaging system indicated at 70 where the particles of the desired sizes are packaged for shipment. Vents 69 are provided for escape of fluidizing air.

In the modification shown in Fig. 2, the vapors are removed immediately after each spraying operation to decrease the pressures that would otherwise oppose vaporization. Two solutions of different sorts of material may be treated or dried simultaneously to provide solid particles that may be non-homogeneous.

In this Fig. 2 reference characters 75 and 75' indicate conduits through which materials to be treated are introduced. These conduits correspond somewhat to the conduit 2 in Fig. 1. The heaters 76 and 76' heat the materials passing through the conduits and the conduits enter the bottoms of the spray chambers 77 and 77' that are provided with spray nozzles 78 and 78', respectively. The baffles 79 and 79' in these spray chambers are provided with sloping corrugated surfaces. The outlets 80 and 80' from these spray chambers extend below the surfaces of the fluidized material in these chambers and the outsides thereof are heated by the heaters 81 and 81'. These outlets extend into the bottoms of the vapor release chambers 82 and 82'. These chambers are provided with sloping plates or tables 83 and 83', having their upper surfaces corrugated as indicated at 84 and 84'. Outlets 85 and 85' to the atmosphere are provided for the vapors released in the chambers 82 and 82'. The pressures within the spraying chambers 77 and 77' may be kept very low by causing the outlets 80 and 80' to extend only far enough into the vapor release chambers 82 and 82' to maintain the "seals."

Classifier tables 86 and 86' similar to those described in connection with Fig. 1 are provided to receive the solid materials from the chambers 82 and 82' and classify them. The plates or tables 83 and 83' may be caused to perform the same result as air-tables 86 and 86' by providing a vibrating means and inclining the plates so as to deliver particles that are classified as to density or size directly into outlets 88, 88' and 90, 90'.

The classifier tables 86 and 86' are provided with gas outlets 87 and 87' to permit the gases to escape to the outside. Valved outlets 88 and 88' are provided at the lower edges of the classifiers 86 and 86'. These outlets are connected to valved return conduits 89 and 89' that are provided with adjustable valves 90 and 90'. A conduit 91 for the finished material is connected to valved outlets 93, 93' and to the conduit 92. Conduit 92 corresponds to the conduit 51 in Fig. 1 and delivers to cooler 94 in the same manner that conduit 51 delivers to cooler 52 in Fig. 1. The cooled finished product is handled in the way described in connection with Fig. 1.

The operation with the apparatus shown in Fig. 1 is as follows:

Solid particles of the material to be treated are fed into the feed column 48 which drives the circulation of solid particles in the system. This column 48 may be provided with the upper container 47 to provide space for a supply of solid particles of the material and thus add flexibility to the system. When wall friction of the system is excessive, gas under pressure may be introduced by inlet 47' at the top of the container 47 to maintain the circulation, in which case the container 47 is provided with an air lock of the known sort.

Heated gas is introduced by blower 1 to the extent that is needed to fluidize the mass of material. This gas may be the products of combustion of water gas or fuel oil for instance, so as to avoid oxidation which otherwise might be deleterious to the product that is to be subjected to such temperatures and exposures. Since the volume of gas needed to fluidize the material under pressure in the system is only about equal to the volume of the material that is being processed when this material consists of granules of soap, for example, only a small portion of the heat required to vaporize the liquid in chamber 10 needs to be introduced as hot gas through conduit 2. More heat is better supplied by the heater 3 due to the steam that is introduced around the tubes 5 from inlet 7. The solid particles entering through conduit 2 are fluidized and flow through these tubes 5. The solution of the material which is to be treated is sprayed in from pipe 14 after it has been made sufficiently hot by heater 16 to vaporize nearly all of the liquid that enters chamber 10, or any desired portion thereof.

The hot gases from blower 1 fluidize the particles that enter conduit 2 from pipe 48 through the heater 3 into the bottom of chamber 10 and spill over the outer edge of baffle 11 but do not entirely fill the chamber 10 due to the pressure maintained therein. These particles are to be treated so as to obtain particles of the desired size by adding one or more layers of solid material to the particles. The entering gas fluidizes the particles in chamber 10 so that the mass boils and flows similar to a liquid.

The hot solution of the material that is sprayed into the chamber 10 coats the turbulent particles of the material. This turbulence is aided by the particles passing over the corrugations 13, and pressure in this chamber causes the fluidized and coated particles to pass upwardly through pipe 18.

As the high frequency electric heating is applied to the material while it is passing through the conduit 20 the stream of fluidized solids is subjected to a concentrated electrostatic high frequency electric field that is established so that the product stream itself is used as the di-electric. In this way molecular vibrations are set up in the material which will intensely heat the particles thereof, thereby driving the vapors out in a most effective manner, thus producing a type of particle which possesses very desirable structure as to solubility.

These particles then pass into the chamber 25 in their fluidized state where they are coated again by means of the solution that is sprayed in by the sprayers 30. The fluidized particles are then forced through the conduit 33 where they are subjected to the heat from the infra red lamps 32 which dries them. The treated products then pass into the expansion stack 36.

The vapors which are separated from the solids in stack 36 pass out through the outlet 37 and the solid particles pass downwardly into the classifier 39. The particles that have been built up to the proper sizes and densities, but not necessarily cooled or conditioned, are separated from the recycling stream by the air table 39 and are routed into the conduit 50.

These particles are driven into the second or conditioning system where they are aerated or fluidized and cooled. Since the cooler 52 of this conditioning system comprises a shell and tube heat exchanger and the fluidized solids pass through the tubes and cooling water is supplied around the tubes with proper turbulence, the fluidized particles are passed in the turbulent manner over the cooled surfaces of the cooler and are delivered properly conditioned to the pressure release stack 56.

The conditioned particles are given a final grading by means of air table 58 which removes the "fines" and delivers them to the recycling system. Oversize particles can also be recovered and ground or milled to fine particles and also placed in the recycling stream.

When the finished product is to be conveyed to a packaging point a system similar to the conditioning portion but without the cooler can be used to convey and distribute the product without damage directly to the cartoner or similar packaging equipment 68.

The baffles 11 and 26 may be made adjustable with respect to conduits 18 and 33 in the fluidizing chambers 10 and 25, thus increasing and decreasing the depth of the bed that is being sprayed and providing the desired spraying space above the fluidized mass.

Since the sprayers 15 and 30 are located concentrically above the boiling surface of fluidized solids it is desirable to have them adjustable vertically so as to coat the particles properly when the surface of the bed is changed.

The temperature of the solution and the temperature and condition of the material that is being treated can be ascertained by trial and can be held at the required point to obtain the desired degree of adherence of new solids to particles previously in the bed.

Also, successive coatings of the particles can be obtained when desired by applying one sort of solution such as builders in the case of soap manufacture in the first chamber 10 followed by another sort of solution such as straight soap in the second chamber 25.

The infra red radiation from lamps 34 removes the moisture that was introduced through sprayers 30.

With this system of heating, wide choices are provided for gaining simplicity, efficiency, product characteristics, besides providing safety from fire or explosion hazards. Superheated steam may be used instead of hot gas from blower 1, to increase the safety when products are treated that will withstand the temperatures that are reached.

The sort of gaseous material that is to be introduced by means of the blower 1 may be determined sometimes by the reduced temperatures needed to produce the finished product. For example, if the material is to be treated at a temperature below room temperature the gas should be sufficient in amount and dried sufficiently to have the high vapor carrying capacity that is needed.

When the material to be processed is such that higher temperatures are permissible the capacity of the gas to carry vapor can be easily increased. Also, vapor as such will separate and serve as aerating gas. But the temperatures should not be above the melting points of the solids that are to be treated after making allowance for the cooling effect of evaporation.

This system can also be employed where pressures below atmospheric are maintained by exhausting from the system sufficient gas and vapor to maintain a negative pressure within. The differential pressures within the system and the hydrostatic heads necessary to cause the flow of fluidized mass can still be obtained. Furthermore, the vapor pressures developed in the liquid surfaces may be sufficiently high to convert these liquids to a vapor that is swept out of the system and is in great excess of the vapor capacity of the fluidizing gas introduced by blower 1. In such a system and where an expensive inert gas is used as the aerating medium, the mixture of vapors and inert gas which are exhausted from the system may be compressed to the degree necessary to cause separation of the liquidized vapors, leaving the separated and compressed inert gas to be reused as the aeration gas in the system.

In carrying out the invention the entrainment of dust can be minimized by aerating the material that is to be processed only enough to provide turbulence needed for heat transfer or for contacting of gas with solids or for particle formation; and the damage to particles by erosions can be decreased by using large enough ducts and vessels to reduce the velocities of the gas sufficiently so that it does not entrain the solid particles to an objectionable extent.

The flow of material through the system is regulated by the difference in weight of solids plus the air pressure in the densely fluidized feed column 48 and the weight of the low density fluidized solids included in ducts and chambers between inlet 2 and outlet 33, plus whatever back pressure exists in the stack 37. This flow can be regulated by slide valve 48'.

In order to avoid caking of the solids in column 48 the compressed air may be introduced some at 47' and also some along the length of column 48 down to slide valve 48' as indicated at 49.

The original supply of the solid particles can be effected by adjusting the system until a suitable bed of material is obtained. Or the bed of material can be produced in a separate conventional spray drying chamber or other suitable device.

The solids bearing feed solution is introduced through pipe 14 into the fluidized chamber 10 according to conditions which will carry away the desired amount of vapor.

The solution introduced through inlet 29 may be superheated to flash at the spray exits 30, thus forming very fine solid particles of which the sizes are determined by the nozzles on sprayers 30 and the pressure that is applied. This particle size may be small and therefore the optimum for vapor release regardless of the size of the final particles desired. These particles will grow as they are recycled and as layers of solid are added from the solution that is introduced by vaporizing nozzles 15 and 30.

The density of the solid particles will depend on the nature of the material heated and the condition of temperature, fluidization, recycling, spraying pressures and nozzle sizes and height of column used.

The operation with the apparatus as shown in Fig. 2 is as follows.

Small particles of material to be treated, which may be of different sorts are introduced or blown in through conduits 75 and 75', respectively. They are heated by heaters 76 and 76' and pass around the edges of baffles 79 and 79' and flow along the corrugated surfaces of these baffles while solutions of materials of different sorts are introduced through spray nozzles 78 and 78' which coat the surfaces of the fluidized materials.

The fluidized and coated particles are forced through outlets 80 and 80' where they are again heated and pass into the chambers 82 and 82' and over the corrugated surfaces 84 and 84' and then to the classifier tables 86 and 86'.

The particles last treated or coated in chambers 77 and 77' that have been built up to the right size with alternate layers of the two sorts are segregated by tables 86 and 86' and pass through conduits or outlets 90 and 90' to conveyor 92 and thence to storage or packaging equipment.

The coated particles reaching classifier tables 86 and 86' which are too small and are separated for recycling are returned through 89 and 89' to the treating chambers 77' and 77, respectively, so that each particle has a coating layer of each sort applied to it alternately until it reaches a size large enough to be separated by one of the tables 86 and 86' and diverted into the conduit 91 and conveyor 92.

Although this process is particularly useful for drying soap or wetting agent solutions, it may be a stage in the alcoholysis and saponification of fats where the methyl ester is saponified as it is sprayed in together with the proper amount of caustic solution in intimate contact and the released alcohol is to be recovered. The conditions required for such reactions according to the teachings of Pats. Nos. 2,383,630 and 2,383,631 are obtainable in this process, and the reactions of the solutions made to occur in the thin films which coat the fluidized carrier particles. In such a case the moisture content of the mixture can be so proportioned as to yield a virtually moisture-free soap. Glycerides may be saponified with caustic solutions by spraying them in accordance with this process, thus obtaining glycerine bearing soap solid particles in the fluidized bed of solid particles at the time and under the conditions at which the reaction takes place. Intermediate chemical solutions that are neutralized to obtain solid detergents therefrom, such as are described in Pats. Nos. Re. 20,636 and 2,159,397, can be sprayed in with caustic solutions in accordance with this invention and neutralized detergents of the desired particle size can be thereby obtained. Products such as detergents, in the form of solid particles of spherical layers can be obtained by spraying alternately solutions of solids of different solubilities; also, milk may be dried in solid particles of suitable sizes by spraying milk on a fluidized moving bed of solid particles of any suitable sort.

An important feature of the chemical processes carried out by this invention is that substantially all of the reaction between the active components in the solution or solutions treated takes place after these solutions have been deposited on the fluidized mass of solid materials and during the time the reaction requires while the mass is flowing. Under these conditions local overheating of delicate materials is avoided due to the fact that during the time chemical reactions are taking place very thin layers or very fine semi-solid particles of material are formed which are surrounded by heat conducting gases and the particles, due to turbulence, come in direct contact with heat conducting surfaces.

It will be clear from the above description that this invention comprises a feed column, an aeration zone, heat generators, spraying chambers, outlet seals for the spraying chambers, de-aeration and exhaust chambers, classifying devices and a travelling mass of aerated solid particles so arranged that all these can be combined, rearranged and multiplied in many ways to provide a suitable arrangement for the drying or chemical reaction process desired.

It will be seen that this invention comprises:

(*a*) A closed conveying system which is analogous to a liquid system wherein flows, turbulence, heat transfer, vapor pressures, interface exposure take place between liquids, solids and gases, and segregation and classification of solid particles all can be variously and accurately controlled with a minimum deformation of the solid particles;

(b) A closed and confined flashing or spraying chamber wherein the fluidized solid particles form the areas and surfaces surrounding these sprays, to serve as a surface conveyor;

(c) A mass of travelling fluidized particles which serves as a heat reservoir and heat transporting medium, also as a surface exposure medium, and also as a medium wherein chemical reactions can readily take place without localized overheating;

(d) A system whereby gases are readily separated from solid particles and the solid particles are classified as to size and density;

(e) An enclosed system wherein vapor pressures are developed and controlled throughout;

(f) An enclosed system wherein various forms of energy are exerted upon the material in process, such as high-frequency electric fields, ultra-violet to infra red lights, mechanical vibrations ranging from high frequencies to merely riffling the material;

(g) A re-forming system wherein particles of solids can be "grown" by adding successive thin layers of semi-solid material and under conditions to gain a wide variety of solid particle structures.

What is claimed is:

1. Process for treating a solution containing solidifiable material which comprises fluidizing by means of a fluidizing gas fine solid particles of said material, transferring said particles to a confined zone, spraying said solution upon said fluidized particles in said zone to coat the same with the solution, passing the coated fluidized particles upwardly out of said zone to and through an electrostatic field to heat the same and drive off vaporous material from the particles, passing the heated and coated fluidized particles to a second confined zone, spraying a second and different heated solution containing solidifiable material upon the fluidized particles in said second zone to coat the same, passing said particles from the second zone upwardly through a radiant heat zone to heat the same and drive off vaporous material from the particles, separating the particles from gaseous and vaporous material including fluidizing gas, classifying said coated particles, withdrawing a portion of the classified coated particles, and returning coated particles finer than those withdrawn to be fluidized as above described.

2. In apparatus of the character described, an aerating chamber, means for fluidizing solid particles outside the chamber, means for introducing said fluidized particles to the bottom of said chamber for upward passage therein, means in said chamber having a downwardly sloping upper surface for directing the movement of said particles after their upward passage, transversely and downwardly of said surface, solution sprayer means extending into said chamber for coating the fluidized mass of particles in the chamber during said transverse and downward movement, and a vertically disposed outlet for said fluidized particles extending into said chamber adjacent to the lower portion of said downwardly sloping surface.

3. In apparatus of the character described, an aerating chamber, means for fluidizing a mass of solid particles outside said chamber, means for introducing said mass of fluidized particles to the bottom of said chamber for upward passage therein, a sprayer extending into said chamber, a vertically disposed outlet for said fluidized particles extending into said chamber and opening below the level of the mass of fluidized particles, and means in the chamber providing a laterally extended surface for flowing a less dense portion of the fluidized mass of particles downwardly towards the opening of said outlet.

4. Process for treating a solution containing solidifiable material by spraying it upon a bed of gas-suspended solid particles, which comprises forming a gas-suspended mass of solid particles, transferring said gas-suspended mass to a confined zone to form a fluidized particles bed therein, causing particles from said bed to flow transversely as a shallow stream, spraying said solution upon said transversely flowing particles to coat the particles with the solution, solidifying said coating, separating the particles from suspending gas, and recycling some of the particles having said solidified coating.

5. Process for producing solid particles of material from a solution containing the reagents for forming such material, which comprises suspending in a gas previously formed solid particles of said material, transferring said gas-suspended particles to a confined zone to form a fluidized particles bed therein, spraying said solution upon said fluidized bed in said zone to coat the particles with the said reagents, said particles serving to provide exposure surfaces upon which a chemical reaction in the liquid-phase takes place, heating said coated, gas-suspended particles to promote said reaction, thereafter withdrawing a portion of the coated particles, and returning to said fluidized bed particles finer than those withdrawn to be coated and to provide exposure surfaces as above described.

6. Process for producing solid particles of soap by saponifying a fatty acid ester with an alkali which comprises suspending in a gas previously formed solid particles of soap, transferring said gas-suspended particles to a confined zone to form a fluidized particles bed therein, spraying fatty acid ester and an alkali solution upon said particles, said particles serving to provide exposure surfaces upon which the saponification reaction in the liquid-phase takes place, heating said coated, gas-suspended particles to promote said reaction, thereafter withdrawing a portion of the coated particles, and returning to said fluidized bed particles finer than those withdrawn to be coated again and to provide exposure surfaces as above described.

7. Process according to claim 6 in which a fatty acid glyceride is saponified with an alkali.

8. Process for producing solid particles of detergent material by neutralizing an intermediate detergent-forming compound which comprises suspending in a gas previously formed solid particles of said material, transferring said gas-suspended particles to a confined zone to form a fluidized particles bed therein, spraying said intermediate compound and a solution of alkali upon said particles, said particles serving to provide exposure surfaces upon which said neutralization reaction in the liquid-phase takes place, heating said coated, gas-suspended particles to promote said reaction, thereafter withdrawing a portion of the coated particles, and returning to said fluidized bed particles finer than those withdrawn to be coated again and to provide exposure surfaces as above described.

9. In a device of the character described, an aerating chamber, an inlet for fluid suspended particles at the bottom of said chamber, a heater for said inlet, a sprayer extending into said chamber, an adjustable baffle in said chamber, said baffle having a laterally extending surface, an outlet from the chamber for said fluid suspended particles having its end in proximity to said baffle, the baffle being positioned between said inlet and outlet and the sprayer being located above the baffle, and a heater for said outlet.

10. Process of forming particles including solid material from solutions containing such material which comprises suspending in a gas previously formed fine solid particles of said material, transferring said gas-suspended particles to a confined zone, forming in said confined zone a fluidized bed of said particles having a maintained fluidized-solids surface, the point of introduction of said gas-suspended particles being below said fluidized-solids surface, spraying said solution upon said fluidized bed of particles from a point above the surface thereof to form a coating of said solution on the particles, withdrawing the coated, gas-suspended particles from within said bed and below the surface thereof, directing the flow of the gas-suspended particles within the fluidized bed toward the surface thereof in their flow from the point of entry to the point of withdrawal, and passing the withdrawn particles through a heating zone to dry the said particles, and separating the dried particles from the accompanying gas and vapors.

11. Process according to claim 10 in which the coated, gas-suspended particles are heated by passing them through an electrostatic field.

12. Process according to claim 10 in which the coated, gas-suspended particles are heated by passing them through a radiant heat zone.

13. Process according to claim 10, wherein the dried particles are classified and the finer particles are returned to be suspended in gas and introduced into said fluidized bed in said confined zone to be further coated therein.

14. In apparatus of the character described, an aerating chamber, means for introducing fluidized solid particles through the bottom of said chamber to form and maintain a fluidized solids bed therein, means adjacent the bottom of the chamber for heating the fluidized particles introduced thereinto, baffle means in the chamber, said baffling means having laterally extending surfaces for directing the flow of the entering fluidized particles upwardly therein and guiding their flow, a sprayer within said chamber above said fluidized bed, means for heating a solution and for introducing the same into the chamber through said sprayer, a vertically disposed outlet for said fluidized particles extending into said chamber below the level of said fluidized particles, means for heating fluidized particles passing through said outlet, and means for separating said particles from gaseous material.

15. In apparatus of the character described, an aerating chamber, means for fluidizing solid particles outside said chamber, means for introducing said fluidized particles through the bottom of said chamber to form and maintain a fluidized solids bed therein and to secure upward passage of the particles in said bed, a sprayer extending downwardly into said chamber and above said bed, a vertically disposed outlet for said fluidized particles extending into said chamber below the level of said fluidized particles, and baffling means in the chamber, said baffling means having laterally extending surfaces for directing the flow of fluidized particles upwardly from the bottom of the chamber towards the sprayer and then over the laterally extending surfaces of said baffling means towards said outlet.

16. In apparatus of the character described, an aerating and fluidizing chamber, an inlet for solid particles at the bottom of said chamber, a heater for said inlet, a baffle extending transversely of said chamber above said inlet and terminating short of the wall of said chamber to provide a passage for said particles in fluidized state, said baffle providing a downwardly inclined upper surface over which said particles flow after travel through said passage, a sprayer extending into said chamber above said baffle, and an outlet from said chamber for said particles, said outlet having its end in proximity to the low portion of said downwardly inclined upper surface of said baffle.

DONALD E. MARSHALL.

REFERENCES CITED

The following references are of record in the file of this patent:

UNITED STATES PATENTS

| Number | Name | Date |
|---|---|---|
| 271,281 | Sherwood et al. | Jan. 30, 1883 |
| 747,935 | Caffall | Dec. 29, 1903 |
| 748,894 | Trump | Jan. 5, 1904 |
| 1,078,848 | Gray et al. | Nov. 18, 1913 |
| 1,157,935 | Gray | Oct. 26, 1915 |
| 1,215,140 | Giller | Feb. 6, 1917 |
| 1,243,878 | Rogers | Oct. 23, 1917 |
| 1,546,922 | Faber | July 21, 1925 |
| 1,797,055 | Douthitt | Mar. 17, 1931 |
| 1,829,477 | Douthitt | Oct. 27, 1931 |
| 1,830,489 | Sproat | Nov. 3, 1931 |
| 1,847,009 | Kollbohm | Feb. 23, 1932 |
| 2,059,983 | Dent et al. | Nov. 3, 1936 |
| 2,232,544 | Lorenz | Feb. 18, 1941 |
| 2,289,191 | Hall | July 7, 1942 |
| 2,297,726 | Stephanoff | Oct. 6, 1942 |
| 2,308,992 | Mertens | Jan. 19, 1943 |
| 2,317,479 | Peebles | Apr. 27, 1943 |
| 2,339,932 | Kuhl | Jan. 25, 1944 |
| 2,340,354 | Wells | Feb. 1, 1944 |
| 2,340,567 | Sargent | Feb. 1, 1944 |
| 2,368,049 | Stratford | Jan. 23, 1945 |
| 2,399,717 | Arveson | May 7, 1946 |
| 2,431,455 | Blanding | Nov. 25, 1947 |
| 2,447,005 | Gamson | Aug. 17, 1948 |
| 2,447,006 | Gamson | Aug. 17, 1948 |
| 2,459,836 | Murphee | Jan. 25, 1949 |
| 2,475,984 | Owen | July 12, 1949 |

FOREIGN PATENTS

| Number | Country | Date |
|---|---|---|
| 563,945 | Great Britain | Sept. 6, 1944 |